(12) United States Patent
Birnbirch et al.

(10) Patent No.: US 6,660,826 B1
(45) Date of Patent: Dec. 9, 2003

(54) POLYETHER ESTER CARBONATES

(75) Inventors: Paul Birnbirch, Solingen (DE); Wolfgang Becker, Moenchengladbach (DE); Norbert Bialas, Dormagen (DE); Rolf Tenhaef, Duesseldorf (DE); Raymond Mathis, Duesseldorf (DE)

(73) Assignee: Cognis Deutschland GmbH & Co. KG, Duesseldorf (DE)

( * ) Notice: Subject to any disclaimer, the term of this patent is extended or adjusted under 35 U.S.C. 154(b) by 0 days.

(21) Appl. No.: 10/031,099

(22) PCT Filed: Jul. 1, 2000

(86) PCT No.: PCT/EP00/06160
§ 371 (c)(1),
(2), (4) Date: May 23, 2002

(87) PCT Pub. No.: WO01/04176
PCT Pub. Date: Jan. 18, 2001

(30) Foreign Application Priority Data

Jul. 10, 1999 (DE) .......................................... 199 32 292

(51) Int. Cl.[7] .............................................. C08G 64/00
(52) U.S. Cl. ....................... 528/198; 428/265; 428/267; 428/288; 428/289; 428/364; 428/480
(58) Field of Search ................................ 528/196, 198, 528/271, 272; 428/265, 267, 288, 289, 364, 480

(56) References Cited

U.S. PATENT DOCUMENTS

| 4,314,000 A | 2/1982 | Thir et al. |
| 5,569,408 A | 10/1996 | Peppmoller et al. |
| 5,683,612 A * | 11/1997 | Birnbrich et al. .......... 252/8.84 |

FOREIGN PATENT DOCUMENTS

| DE | 38 36 468 | 5/1990 |
| DE | 41 13 889 | 10/1992 |
| EP | 0 146 234 | 6/1985 |
| EP | 0 421 298 | 4/1991 |
| EP | 0 277 007 | 9/1992 |
| EP | 0 511 589 | 11/1992 |
| EP | 0 743 992 | 1/1998 |
| FR | 1 429 079 | 1/1966 |
| WO | WO 92/19664 | 11/1992 |
| WO | WO 00/14141 | 3/2000 |

OTHER PUBLICATIONS

Ullmann's Encyclopadie der technischen Chemie, pp. 7–9, Ed. 23, Verlag Chemie, Weinheim, (1983).

"Reickert: Prapartionen bei Filamentgarnen", p. 197, Melliand Textilberichte, (1977).

* cited by examiner

Primary Examiner—Terressa M. Boykin
(74) Attorney, Agent, or Firm—John E. Drach; Steven J. Trzaska

(57) ABSTRACT

A spin finish composition comprising a polyester carbonate corresponding to formula I:

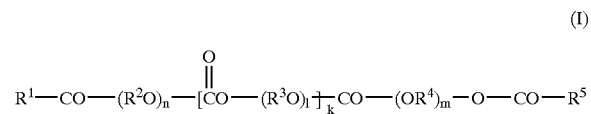

(I)

wherein $R^1$ and $R^5$ independently of one another represent linear or branched, saturated or unsaturated alkyl groups containing from about 6 to 21 carbon atoms, $R^2$ and $R^4$ independently of one another represent alkyl groups containing from about 2 to 4 carbon atoms, $R^3$ represents a saturated or unsaturated, linear or branched difunctional hydrocarbon radical containing 1 to 22 carbon atoms, k has a value of 0 or 1 to 50, l has a value of 1 to 300, n has a value of 2 to 50 and m has a value of from 2 to 50.

36 Claims, No Drawings

POLYETHER ESTER CARBONATES

BACKGROUND OF THE INVENTION

This invention relates to polyester carbonates, to a process for the production of the polyester carbonates, to spin finishes for synthetic fibers containing the polyester carbonates as lubricants and to the use of the polyester carbonates as lubricants in spin finishes for synthetic fibers.

Immediately after the fiber forming process, manmade fibers are provided with finishes which are essential to the subsequent processing of the fibers. These finishes (cf. Ullmann's Encyclopädie der technischen Chemie, Vol. 23, pages 7–9, Verlag Chemie, Weinheim 1983) provide the fibers with the necessary surface slip between the fibers themselves and between the fibers and the guide elements of the spinning machines. In addition, spin finishes are generally expected to satisfy the following requirements: fiber cohesion, antistatic effect, good wetting of the fiber, heat resistance, no corrosion of metals, no deposits on the stretching and texturing elements, ready removability from the fibres and physiological compatibility. Since the spin finishes can enter the wastewater during their removal from the fibers, for example before dyeing, it is also desirable that they and above all the lubricants present in them in large quantities be readily biodegradable.

The lubricants in the spin finishes are supposed above all to provide the fibers with the necessary surface slip. In addition, the lubricants should be heat-resistant, non-corrosive, easy to remove from the fiber and physiologically safe so that the requirements the spin finishes are expected to meet are satisfied. Typical lubricants for spin finishes are vegetable, animal and mineral oils or even synthetic esters, silicones, polyethers, ethoxylated fatty acids and the like (cf. Ullmann's Encyclopädie der technischen Chemie, Vol. 23, pages 7–9, Verlag Chemie, Weinheim 1983).

In addition, spin finishes for synthetic fibers are expected to withstand severe heat stress as encountered in the texturing of polyester and polyamide fibers. Accordingly, heat-resistant ester oils, i.e. esters of higher fatty acids with long-chain fatty alcohols, are often used as lubricants in such spin finishes. Other suitable lubricants besides heat-resistant ester oils are polyethylene oxide/polypropylene oxide block copolymers which are known to the expert as "pluronics". Pluronics are capable of depolymerizing completely at relatively high temperatures. This is of particular advantage in texturing because deposits on filaments and texturing elements are avoided. However, a disadvantage is that fragments of the pluronics, for example aldehydes, escape into the atmosphere during texturing which is harmful to man and the environment. In addition, pluronics have the serious disadvantage that they are virtually non-biodegradable.

German patent application DE-A41 13 889 describes water-soluble, biodegradable polycarbonates and their use as lubricants for synthetic yarns. These polycarbonates must contain a) at least one polyalkylene glycol ether block,
b) at least one optionally ethoxylated fatty alcohol containing 6 to 22 carbon atoms and
c) a carbonic acid residue connecting a) to b).

Although these polycarbonates show acceptable thermal behavior, their surface slip properties—particularly at relatively high speeds in the machine processing of synthetic fibers—are in need of improvement.

European patent application EP-A-421 298 describes lubricant compositions which contain carbonic acid polyol esters and which are distinguished by their lubricating effect and low smoke emission. Industrial transmission oils, engine oils, lubricants for refrigerators and lubricants for fibers are mentioned as applications. The invention is particularly concerned with CFC-containing lubricant compositions for refrigerators.

U.S. Pat. No. 4,314,00 describes polycarbonates of a lower alcohol and one or more polyoxyalkylene blocks which may be used as lubricants for spin finishes. Although these polycarbonates show excellent solubility in water, their surface slip properties are unsatisfactory.

European patent application EP-A-146 234 relates to polycarbonates which may be obtained by reacting alcohols with cyclic carbonates in a decarboxylation reaction and which may be alkoxylated in a subsequent step. They are also suitable for use as lubricants in spin finishes.

Now, the problem addressed by the present invention was to provide spin finishes for synthetic fibers which would contain lubricants with improved properties in relation to known compounds. These lubricants would have good surface slip properties and would be readily soluble in water. In addition, the lubricants would have low friction coefficients on polyester fibers, particularly under the rigorous conditions of friction texturing.

It has been found that certain polyester carbonates satisfy the requirements mentioned above.

DETAILED DESCRIPTION OF THE INVENTION

In a first embodiment, the present invention relates to polyester carbonates corresponding to general formula (I):

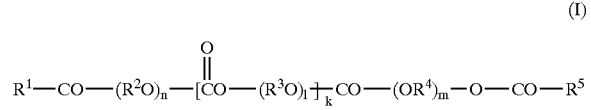

in which
  $R^1$ and $R^5$ independently of one another represent linear or branched, saturated or unsaturated alkyl groups containing 6 to 21 carbon atoms,
  $R^2$ and $R^4$ independently of one another represent alkyl groups containing 2 to 4 carbon atoms,
  $R^3$ represents a saturated or unsaturated, linear or branched difunctional hydrocarbon radical containing 1 to 22 carbon atoms,
  k has a value of 0 or 1 to 50,
  l has a value of 1 to 300,
  n has a value of 2 to 50 and
  m has a value of 2 to 50.

The polyester carbonates of formula (I) according to the invention are preferably produced by reacting alkoxylated carboxylic acids with diols in the presence of dialkyl carbonates and basic catalysts. Accordingly, the present invention also relates to a process for the production of polyester carbonates corresponding to formula (I), characterized in that alkoxylated carboxylic acids corresponding to formula (II):

are reacted with diols corresponding to formula (III):

and dialkyl carbonates corresponding to formula (IV):

where $R^6$ is an alkyl group containing 6 to 21 carbon atoms, $R^7$ is a $C_2H_4$ and/or $C_3H_6$ group, $R^8$ is a difunctional alkyl group containing 1 to 22 carbon atoms and $R^9$ and $R^{10}$ independently of one another represent a methyl or ethyl group and a is a number of 2 to 50, in the presence of basic catalysts at temperatures of 60 to 200° C.

The reaction of compounds (II) to (IV) is preferably carried out by simultaneously reacting the three reactants. The more readily volatile alcohol of the carbonate (for example methanol or ethanol) is distilled off during the reaction, optionally together with excess dialkyl carbonate. As known to the expert, other lower-order polymers, for example dimer fatty acid ethoxylates, exist alongside the compounds of formula (I) under the described reaction conditions. In a preferred embodiment, the process according to the invention is carried out by reacting the starting compounds of formulae (II) to (IV) in a molar ratio of about 1:1:1 or in a molar ratio of about 2:1:2 in the manner described above in order to obtain the desired compounds of formula (I). Molar ratios of 2:1:4 are particularly preferred.

The starting compounds of the reaction, i.e. alkoxylated carboxylic acids of formula (II), are compounds known per se which may be prepared by any of the reactions of fatty acids with alkoxides known to the expert for this purpose. Carboxylic acids of formula (II) where the alkyl group $R^6$ contains 6 to 21 carbon atoms and the fatty acid has been reacted with 2 to 50 moles alkoxide are particularly preferred for the purposes of the present invention. Suitable acids for the alkoxylation are, for example, heptanoic, octanoic, nonanoic, decanoic, undecanoic, dodecanoic, tridecanoic, tetradecanoic, pentadecanoic, hexadecanoic, heptadecanoic, octadecanoic, octadecane-12-oleic, nonadecanoic and eicosanoic acid. Besides the saturated fatty acids described here, it is also possible to use unsaturated fatty acids, for example 10-undecenoic acid, 9c-dodecenoic acid, 9c-tetradecenoic acid, 9c-hexadecenoic acid, 6c-octadecenoic acid, 6t-octadecenoic acid, 9c-octadecenoic acid, 9t-octadecenoic acid, 9c-octadecen-12-oleic acid, 9c,12c-octadecadienoic acid, 9t, 12t-octadecadienoic acid, 9c,12c,15c-octadecatrienoic acid, 9c,11t, 13t-octadecatrienoic acid, 9c-eicosenoic acid, 5,8,11,14-eicosatetraenoic acid. The fatty acids are preferably reacted with ethylene oxide and/or propylene oxide and then further reacted as described above to form the products corresponding to formula (I). According to the invention, it is absolutely essential for the fatty acids to have been reacted with at least 2 mols alkoxide per mol fatty acid. Reaction products of the fatty acids with ethylene oxide are particularly preferred. Where alkoxylates containing both ethylene oxide (EO) and propylene oxide (PO) are present, no particular order is necessary. In other words, both EO/PO block polymers and EO/PO random polymers may be used.

The diols corresponding to formula (III) are preferably selected from ethylene glycol, diethylene glycol and polyethylene glycol (PEG), molecular weights of 100 to 2,000 being preferred in the latter case. PEGs with molecular weights of >300 and more particularly 400 to 600 are preferably used. However, propylene glycol, ethylene glycol and the higher homologs of these diols and oligomers and polymers thereof may also be used. Other diols suitable for the purposes of the present technical teaching are octane-1, 2-diol, decane-1,2-diol, 1,2-hexadecanol, 1,2-octadecanol and/or technical mixtures thereof. Corresponding alkane-1, 2-diols are obtainable, for example, by acid-catalyzed ring opening of terminally epoxidized alkanes with water. Other suitable diols are α,ω-alkanediols which contain a terminal hydroxyl group and which are obtainable by hydrogenation of the corresponding dicarboxylic acids.

According to the invention, the compounds corresponding to formulae (II) and (III) are reacted with dialkyl carbonates corresponding to formula (IV) in the presence of alkaline catalysts. The dialkyl carbonates are known compounds. Both symmetrical compounds ($R_9=R_{10}$) and nonsymmetrical compounds ($R_9 \neq R_{10}$) may be used. Dimethyl carbonates (DMC) and diethyl carbonates (DEC), i.e. $R^9$ and $R^{10}$ are methyl or ethyl groups, are particularly preferred.

Suitable basic catalysts are, for example, alkali metal alkylates, more especially sodium methylate.

Polyester carbonates corresponding to formula (I) are suitable as lubricants in spin finishes for synthetic fibers. Accordingly, the present invention also relates to spin finishes containing polyester carbonates corresponding to formula (I) as lubricants.

It has proved to be of advantage to select compounds of formula (I) where the index k in formula (I) is a number of 1 to 50 or represents 0. Another preferred embodiment is characterized by the use of polyester carbonates where the substituents $R_1$ and $R_5$ contain 6 to 18 and preferably 6 to 11 carbon atoms. The substituents $R^2$ and $R^3$ are preferably $CH_2CH_2$— and/or $CH_2$—$CH(CH_3)$-groups or blocks of $CH_2CH_2$— and $CH_2$—$CH(CH_3)$—. Compounds of formula (I) in which $R^3$ represents a $CH_2CH_2$— or $CH_2$—$CH(CH_3)$-group, preferably a $CH_2CH_2$-group are particularly preferred. The number of alkoxide groups as determined by the indices n and m in formula (I) is preferably in the range from 2 to 25, more preferably in the range from 2 to 15 and most particularly in the range from 2 to 10. Another preferred embodiment is characterized by the use of polyester carbonates corresponding to formula (I) where the index l has a value of 1 to 100, preferably 1 to 50 and more particularly 1 to 20.

The expert will preferably select polyester carbonates which are soluble in water. Solubility in water in the context of the present invention means that a 40% by weight solution of the carbonates in water at 20° C. can be prepared without any precipitation or clouding occurring. Other preferred polyester carbonates corresponding to formula (I) are those of which the residual hydroxyl value (OH value, as measured to DIN 53 240-2 (December/1993)) is at most 60 and preferably below 30. So far as the residual acid value of the compounds of formula (I) are concerned, it is preferred to select polyester carbonates with an acid value (as measured to DIN 53 169) of at most 5 and, more particularly, at most 1.

It ought to mentioned at this juncture that the described polyester carbonates can also act as associative thickeners, i.e. they lead to a distinct increase in viscosity on dissolution in water. In the formulation of spin finishes, however, an increase in viscosity on dissolution in water is generally undesirable because ready pumpability of the finish is required in this technical field. These spin finishes are preferably suitable for use in the production of synthetic fibers, such as polypropylene, polyester, polyamide fibers or blends thereof.

According to the invention, preferred spin finishes are characterized in that, besides the lubricants corresponding to formula (I), they also contain water, preferably in quantities of 80 to 99% by weight, based on the finish as a whole. Besides the lubricants, the spin finishes according to the invention may also contain emulsifiers, wetting agents and/or antistatic agents and optionally typical auxiliaries, such as pH adjusters, fiber compacting agents, bactericides and/or corrosion inhibitors.

Suitable emulsifiers, wetting agents and/or antistatic agents are anionic, cationic and/or nonionic surfactants, such as mono- and/or diglycerides, for example glycerol monooleate and/or glycerol dioleate, alkoxylated, preferably ethoxylated and/or propoxylated fats or oils, fatty alcohols containing 8 to 24 carbon atoms and/or $C_{8-18}$ alkyl phenols, for example products of the addition of 25 mols ethylene oxide onto castor oil and/or products of the addition of 8 mols propylene oxide and 6 mols ethylene oxide onto $C_{16-18}$ fatty alcohols, optionally alkoxylated $C_{8-24}$ fatty acid monoethanolamides and/or diethanolamides, for example optionally ethoxylated oleic acid monoethanolamide and/or diethanolamide, tallow fatty acid monoethanolamide and/or diethanolamide and/or coconut fatty acid monoethanolamide and/or diethanolamide, alkali metal and/or ammonium salts of alkoxylated, preferably ethoxylated and/or propoxylated, optionally end-capped $C_{8-22}$ alkyl and/or $C_{8-22}$ alkylene alcohol sulfonates, reaction products of optionally alkoxylated $C_{8-22}$ alkyl alcohols with phosphorus pentoxide or phosphorus oxychloride in the form of their alkali metal, ammonium and/or amine salts, for example phosphoric acid esters of ethoxylated $C_{12-14}$ fatty alcohols neutralized with alkanolamine, alkali metal and/or ammonium salts of $C_{8-22}$ alkyl sulfosuccinates, for example sodium dioctyl sulfosuccinate and/or amine oxides, for example dimethyl dodecyl amine oxide. Regarding this exemplary list, it is important to bear in mind that many of the substances mentioned can have not just one function, but several functions. For example, an antistatic agent can also act as an emulsifier.

Optional constituents may be any of the usual auxiliaries. Suitable fiber compacting agents are the polyacrylates, fatty acid sarcosides and/or copolymers with maleic anhydride known from the prior art (cf. Melliand Textilberichte (1977), page 197) and/or polyurethanes according to DE-A 38 36 468, pH adjusters, such as $C_{1-4}$ hydroxycarboxylic acids, for example acetic acid and/or glycolic acid, alkali metal hydroxides, such as potassium hydroxide, and/or amines, such as triethanolamide, bactericides and/or corrosion inhibitors.

The spin finishes according to the invention may be prepared by lintensive mixing of the polyester carbonates (I) and optionally other lubricants, emulsifiers, wetting agents, antistatic agents and/or typical auxiliaries at 18 to 25° C.

As is common practice in the textile industry, the spin finishes are applied to the synthetic fibers immediately they leave the spinneret in the form of aqueous solutions or, in the absence of adequate solubility, in the form of aqueous dispersions. The spin finishes, which have a temperature of 18 to 60° C., are applied by application rollers or dosing stations via suitable applicators. Spin finishes in the form of aqueous solutions, which have a total active substance content of about 1 to 45% by weight and preferably 5 to 40% by weight, are preferred. Based on the total active substance content, the spin finishes according to the invention contain a) 35 to 100% by weight lubricants, b) 0 to 65% by weight emulsifiers, antistatic agents and/or wetting agents, c) 0 to 10% by weight pH adjusters, bactericides and/or corrosion inhibitors, the quantities being selected so that they add up to 100% by weight. The lubricants mentioned in this list comprise the described polyester carbonates (I) and the lubricants known from the prior art, with the proviso that at least 50% by weight, preferably at least 75% by weight and more preferably 100% by weight of the lubricants are polyester carbonates corresponding to general formula (I). Lubricant preparations containing 1 to 45% by weight lubricants corresponding to formula (I) and 99 to 45% by weight water are particularly preferred.

The quantity in which the spin finishes in the form of aqueous solutions are applied is in the range typically encountered in the textile industry of 0.1 to 3% by weight, based on the weight of the fibers. Synthetic fibers of polypropylene, polyester and/or polyamide are provided with the spin finishes according to the invention. The spin finishes according to the invention provide the synthetic fibers with the necessary surface slip properties. The spin finishes according to the invention show sufficiently high thermal stability even during the texturing of the synthetic fibers, so that very few, if any, unwanted deposits are observed on the fibers and/or the texturing elements. Crimping of the synthetic fibers treated with the spin finishes according to the invention is also readily possible and is characterized by stability.

Besides their use as lubricants in spin finishes, the compounds corresponding to formula (I) are also suitable as winding oils. Winding oils are lubricants which are applied to the fibers after spinning to facilitate their subsequent textile processing, more especially rewinding. Winding oils are also known as warping oils, weft winding oils, twisting oils or knitting oils, depending on the particular application. The winding oils are applied to the fibers in quantities of 1 to 4% by weight, so that the emission potential of the lubricants in this application is distinctly increased in relation to the spin finishes. Accordingly, the choice of low-emission, ecologically safe substances is all the more important for this particular use. The compounds corresponding to formula (I) satisfy these requirements. Accordingly, the present invention also relates to the use of compounds corresponding to formula (I) as winding oils for synthetic fibers.

EXAMPLES

Production of the polyester carbonates according to the invention:

1. 779.1 g lauric acid×7 EO (1.5 mol) are combined with 300 g polyethylene glycol (MW 400) (0.75 mol) and 236.3 g dimethyl carbonate (2.7 mol) in the presence of 8.77 g sodium methylate (30% solution in methanol) and heated with stirring to 140° C. The reaction was terminated when no more ethanol could be distilled off. OH value 27, acid value 0.5.

2. 779.1 g lauric acid×7 EO (1.5 mol) were reacted with 450 g polyethylene glycol (MW 600) (0.75 mol) and 236.3 g dimethyl carbonate (2.7 mol) in the presence of 9.43 g sodium methylate (30% solution in methanol) as described in 1. OH value 21, acid value 0.4.

3. 701 g (1 mol) of a coconut oil fatty acid alkoxylated with 2 mols PO and 10 mols EO were reacted with 200 g polyethylene glycol (MW 400) (0.5 mol) and 157.5 g dimethyl carbonate (1.75 mol) in the presence of 7.06 g sodium methylate (30% solution in methanol). OH value 22, acid value 0.2.

4. 701.3 g (1 mol) coconut oil fatty acid alkoxylated with 2 mols PO and 10 mols EO were reacted with 300 g polyethylene glycol (MW 600) (0.5 mol) and 157.5 g dimethyl carbonate (1.75 mol) in the presence of 7.7 g sodium methylate (30% solution in methanol).

5. 660 g (1 mol) of a fatty acid mixture of $C_{12-18}$ fatty acids alkoxylated with 10.5 mols EO were reacted with 200 g polyethylene glycol (MW 400) (0.5 mol) and 157.5 g dimethyl carbonate (1.75 mol) in the presence of 6.78 g sodium methylate (30% solution in methanol). OH value 27, acid value 0.8.

6. As 5., except that PEG 600 is used.

C Comparison product: 420.5 g decyl alcohol+3 EO (1.5 mol) were reacted with 300 g PEG 400 (0.75 mol) and 236 g dimethyl carbonate (2.6 mols) in the presence of 6.4 g sodium methylate (30% solution in methanol). OH value 21.

The data of the individual Examples are set out in Table 1.

TABLE 1

| Compound | Acid alkoxylate (1 mol) | Mols DMC | MW PEG (1 mol) | Consistency active substance | Solubility in water (40%) | OH value/ acid value |
|---|---|---|---|---|---|---|
| 1 | Lauric acid x 7EO | 1.8 | 400 | Liquid/sediments | Clearly soluble | 27.0/0.5 |
| 2 | Lauric acid x 7 EO | 1.8 | 600 | Liquid/sediments | Clearly soluble | 21.0/0.4 |
| 3 | Coconut fatty acid x 2PO x 10.5EO | 1.75 | 400 | Liquid/sediments | Clearly soluble | 22.0/0.2 |
| 4 | Coconut fatty acid x 2PO x 10EO | 1.75 | 600 | Liquid/sediments | Clearly soluble | —/— |
| 5 | $C_{12-18}$ fatty acids x 10.5 EO | 1.75 | 400 | Liquid/sediments | Clearly soluble | 27.0/0.8 |
| 6 | $C_{12-18}$ fatty acids x 10.5 EO | 1.75 | 600 | Liquid/sediments | Clearly soluble | 25.0/1.0 |

TABLE 2

Storage test polyester carbonates

| | Brookfield viscosity (40%) (mPas) | Brookfield viscosity after 6 d/60° C. (40%) | Brookfield viscosity after 25 d/60° C. (40%) | Acid value (40%) after 25 d/60° C. |
|---|---|---|---|---|
| 1 | 520 | 480 | 464 | 0.71 |
| 2 | 924 | 850 | 720 | 0.90 |
| 3 | 608 | 470 | 416 | 0.53 |
| 4 | 280 | 240 | 188 | 0.68 |
| 5 | 1600 | 1500 | 825 | 0.85 |
| 6 | 1720 | 1160 | 338 | 0.78 |

Polyamide filaments (yarn type PA 6.—$H_2O$, dtex 74 and PES, dtex 265) were finished with the polyester carbonates of Examples 1 to 6 from aqueous solution so that an oil add-on of 0.25, 0.5, 1.0 and 1.5% by weight was obtained.

Electrostatic charging on ceramic was measured at speeds (friction rod with $0.5\mu$ roughness) of 20 and 200 m per minute using an Eltecs inductive voltmeter (climate: 20° C./65% relative humidity).

For comparison, a commercially available product (reaction of an ethoxylated fatty alcohol with DMC and PEG—product C) was measured under the same conditions. The results are set out in Table 3.

TABLE 3a

Electrostatic charging (KV/m) of PA 6 on a friction rod (roughness $0.5\mu$) at a yarn speed of 100 m/min; indication of the dynamic friction coefficient ($\mu$).

| | Add-on (in % by weight) | | | | |
|---|---|---|---|---|---|
| Finish | 0.25 | 0.50 | 1.00 | 1.50 | |
| 1 | −0.1 | 0.3 | −0.9 | −1.0 | KV/m |
|   | 0.400 | 0.388 | 0.480 | 0.591 | $\mu$ |
| 2 | 1.6 | 1.1 | −0.6 | −0.4 | KV/m |
|   | 0.384 | 0.401 | 0.481 | 0.536 | $\mu$ |
| 3 | −1.5 | −1.9 | −1.4 | −1.3 | KV/m |
|   | 0.408 | 0.397 | 0.457 | 0.513 | $\mu$ |
| 4 | −1.2 | −1.4 | −1.0 | −0.7 | KV/m |
|   | 0.382 | 0.400 | 0.439 | 0.514 | $\mu$ |
| 5 | −0.2 | −1.4 | −1.2 | −0.7 | KV/m |
|   | 0.396 | 0.401 | 0.455 | 0.542 | $\mu$ |
| 6 | −0.8 | −1.3 | −0.9 | −0.7 | KV/m |
|   | 0.386 | 0.406 | 0.452 | 0.498 | $\mu$ |
| C | −14 | −2.4 | −1.9 | −1.2 | KV/m |
|   | 0.356 | 0.409 | 0.529 | 0.672 | $\mu$ |

TABLE 3b

Electrostatic charging (KV/m) of PA 6 on a friction rod (roughness $0.5\mu$) at a yarn speed of 200 m/min; indication of the dynamic friction coefficient ($\mu$).

| | Add-on (in % by weight) | | | | |
|---|---|---|---|---|---|
| Finish | 0.25 | 0.50 | 1.00 | 1.50 | |
| 1 | 1.7 | 2.6 | 0.0 | 0.0 | KV/m |
|   | 0.427 | 0.413 | 0.481 | 0.558 | $\mu$ |
| 2 | 1.4 | 1.8 | 0.5 | 1.1 | KV/m |
|   | 0.413 | 0.423 | 0.479 | 0.494 | $\mu$ |
| 3 | −0.3 | 0.1 | 1.6 | −0.4 | KV/m |
|   | 0.428 | 0.418 | 0.454 | 0.480 | $\mu$ |
| 4 | −1.1 | −1.1 | −0.6 | −0.4 | KV/m |
|   | 0.413 | 0.430 | 0.442 | 0.470 | $\mu$ |
| 5 | 0.9 | 0.3 | 0.1 | 0.2 | KV/m |
|   | 0.425 | 0.428 | 0.464 | 0.495 | $\mu$ |
| 6 | −0.3 | 1.6 | 0.1 | 0.3 | KV/m |
|   | 0.410 | 0.422 | 0.455 | 0.475 | $\mu$ |
| C | −2.7 | −2.5 | −1.6 | −0.5 | KV/m |
|   | 0.396 | 0.448 | 0.550 | 0.678 | $\mu$ |

TABLE 3c

Electrostatic charging (KV/m) of PES on a friction rod (roughness $0.5\mu$) at a yarn speed of 100 m/min; indication of the dynamic friction coefficient ($\mu$).

| | Add-on (in % by weight) | | | | |
|---|---|---|---|---|---|
| Finish | 0.25 | 0.50 | 1.00 | 1.50 | |
| 1 | −0.8 | −1.8 | −1.2 | −0.6 | KV/m |
|   | 0.387 | 0.376 | 0.451 | 0.559 | $\mu$ |
| 2 | −2.0 | −2.4 | −1.3 | −0.6 | KV/m |
|   | 0.389 | 0.355 | 0.442 | 0.558 | $\mu$ |
| 3 | −1.9 | −4.2 | −1.2 | −0.5 | KV/m |
|   | 0.394 | 0.368 | 0.457 | 0.594 | $\mu$ |
| 4 | −1.9 | −1.4 | −0.7 | −0.2 | KV/m |
|   | 0.377 | 0.408 | 0.502 | 0.624 | $\mu$ |
| 5 | −1.4 | −2.2 | −0.6 | −0.4 | KV/m |
|   | 0.375 | 0.349 | 0.471 | 0.529 | $\mu$ |
| 6 | −1.7 | −1.5 | −0.9 | −0.2 | KV/m |
|   | 0.362 | 0.389 | 0.444 | 0.538 | $\mu$ |
| C | −0.9 | −0.5 | −0.1 | −0.5 | KV/m |
|   | 0.356 | 0.409 | 0.529 | 0.672 | $\mu$ |

TABLE 3d

Electrostatic charging (KV/m) of PES on a friction rod (roughness 0.5μ) at a yarn speed of 200 m/min; indication of the dynamic friction coefficient (μ).

| Finish | Add-on (in % by weight) | | | | |
| --- | --- | --- | --- | --- | --- |
| | 0.25 | 0.50 | 1.00 | 1.50 | |
| 1 | −1.9 | 2.7 | −1.9 | −1.4 | KV/m |
|   | 0.418 | 0.414 | 0.490 | 0.542 | μ |
| 2 | −10.2 | −4.7 | −1.7 | −1.2 | KV/m |
|   | 0.388 | 0.410 | 0.478 | 0.528 | μ |
| 3 | −7.5 | −2.6 | −1.6 | −1.0 | KV/m |
|   | 0.400 | 0.403 | 0.485 | 0.549 | μ |
| 4 | −6.8 | −2.6 | −1.3 | −0.5 | KV/m |
|   | 0.380 | 0.420 | 0.498 | 0.557 | μ |
| 5 | −7.5 | −2.6 | −1.6 | −1.0 | KV/m |
|   | 0.385 | 0.391 | 0.460 | 0.505 | μ |
| 6 | −6.8 | −2.6 | −1.3 | −0.5 | KV/m |
|   | 0.374 | 0.407 | 0.460 | 0.498 | μ |
| C | −2.8 | −1.5 | −0.3 | 0.0 | KV/m |
|   | 0.396 | 0.448 | 0.550 | 0.678 | μ |

What is claimed is:

1. A spin finish composition comprising a polyester carbonate corresponding to formula I:

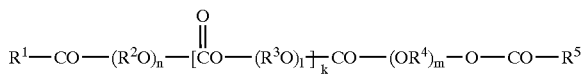

(I)

wherein $R^1$ and $R^5$ independently of one another represent linear or branched, saturated or unsaturated alkyl groups containing from about 6 to 21 carbon atoms, $R^2$ and $R^4$ independently of one another represent alkyl groups containing from about 2 to 4 carbon atoms, $R^3$ represents a saturated or unsaturated, linear or branched difunctional hydrocarbon radical containing 1 to 22 carbon atoms, k has a value of 0 or 1 to 50, l has a value of 1 to 300, n has a value of 2 to 50 and m has a value of from 2 to 50.

2. The composition of claim 1 wherein the polyester carbonate is present in the composition in an amount of at least about 35% by weight, based on the weight of the composition.

3. The composition of claim 1 wherein in formula (I) k has a value of from 1 to 50.

4. The composition of claim 1 wherein in formula (I) k has a value of 0.

5. The composition of claim 1 wherein in formula (I) $R^2$ and $R^3$ are $CH_2CH_2$— and/or $CH_2$—$CH(CH_3)$— groups.

6. The composition of claim 1 wherein in formula (I) $R^3$ is a $CH_2CH_2$— or $CH_2$—$CH(CH_3)$— group.

7. The composition of claim 1 wherein in formula (I) $R^1$ and $R^5$ are substituents containing from about 6 to 18 carbon atoms.

8. The composition of claim 1 wherein in formula (I) $R^1$ and $R^5$ are substituents containing from about 6 to 11 carbon atoms.

9. The composition of claim 1 wherein in formula (I) n and m independently of one another are numbers from 2 to 25.

10. The composition of claim 1 wherein in formula (I) n and m independently of one another are numbers from 2 to 15.

11. The composition of claim 1 wherein in formula (I) n and m independently of one another are numbers from 2 to 10.

12. The composition of claim 1 wherein in formula (I) l is a number from 1 to 100.

13. The composition of claim 1 wherein in formula (I) l is a number from 1 to 50.

14. The composition of claim 1 wherein in formula (I) l is a number from 1 to 20.

15. The composition of claim 1 wherein the polyester carbonates of formula (I) are water-soluble.

16. The composition of claim 1 wherein the polyester carbonates of formula (I) have a hydroxyl value of at most 60.

17. The composition of claim 1 wherein the polyester carbonates of formula (I) have an acid value of at most 5.

18. A process for lubricating synthetic fibers comprising contacting the fibers with a spin finish composition containing a polyester carbonate corresponding to formula I:

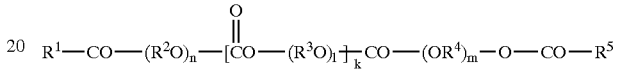

(I)

wherein $R^1$ and $R^5$ independently of one another represent linear or branched, saturated or unsaturated alkyl groups containing from about 6 to 21 carbon atoms, $R^2$ and $R^4$ independently of one another represent alkyl groups containing from about 2 to 4 carbon atoms, $R^3$ represents a saturated or unsaturated, linear or branched difunctional hydrocarbon radical containing 1 to 22 carbon atoms, k has a value of 0 or 1 to 50, l has a value of 1 to 300, n has a value of 2 to 50 and m has a value of from 2 to 50.

19. The process of claim 18 wherein the polyester carbonate is present in the composition in an amount of at least about 35% by weight, based on the weight of the composition.

20. The process of claim 18 wherein in formula (I) k has a value of from 1 to 50.

21. The process of claim 18 wherein in formula (I) k has a value of 0.

22. The process of claim 18 wherein in formula (I) $R^2$ and $R^3$ are $CH_2CH_2$— and/or $CH_2$—$CH(CH_3)$— groups.

23. The process of claim 18 wherein in formula (I) $R^3$ is a $CH_2CH_2$— or $CH_2$—$CH(CH_3)$— group.

24. The process of claim 18 wherein in formula (I) $R^1$ and $R^5$ are substituents containing from about 6 to 18 carbon atoms.

25. The process of claim 18 wherein in formula (I) $R^1$ and $R^5$ are substituents containing from about 6 to 11 carbon atoms.

26. The process of claim 18 wherein in formula (I) n and m independently of one another are numbers from 2 to 25.

27. The process of claim 18 wherein in formula (I) n and m independently of one another are numbers from 2 to 15.

28. The process of claim 18 wherein in formula (I) n and m independently of one another are numbers from 2 to 10.

29. The process of claim 18 wherein in formula (I) l is a number from 1 to 100.

30. The process of claim 18 wherein in formula (I) l is a number from 1 to 50.

31. The process of claim 18 wherein in formula (I) l is a number from 1 to 20.

32. The process of claim 18 wherein the polyester carbonates of formula (I) are water-soluble.

33. The process of claim 18 wherein the polyester carbonates of formula (I) have a hydroxyl value of at most 60.

34. The process of claim 18 wherein the polyester carbonates of formula (I) have an acid value of at most 5.

35. A process for making polyester carbonates comprising:
(a) providing an alkoxylated carboxylic acid corresponding to formula II:

$$R^6\text{—}CO_2\text{—}(R^7O)_a\text{—}H \quad (II)$$

wherein $R^6$ is an alkyl group containing 6 to 21 carbon atoms, $R^7$ is a $C_2H_4$ and/or $C_3H_6$ group, and a is a number from 2 to 50;

(b) providing a diol corresponding to formula III:

$$HO\text{—}R^8\text{—}OH \quad (III)$$

wherein $R^8$ is a difunctional alkyl group containing 1 to 22 carbon atoms;

(c) providing a dialkyl carbonate corresponding to formula (IV):

$$R^9O\text{—}CO\text{—}OR^{10} \quad (IV)$$

wherein $R^9$ and $R^{10}$ independently of one another represent a methyl or ethyl group; and (d) reacting (a)–(c), in the presence of a basic catalyst at a temperature of from about 60 to 200° C. to for the polyester carbonate.

36. The process of claim 35 wherein formulae (II), (III) and (IV) are reacted in a molar ratio of about 2:1:4.

* * * * *